United States Patent [19]

Rhodes

[11] Patent Number: 5,772,843
[45] Date of Patent: Jun. 30, 1998

[54] EVAPORATOR

[76] Inventor: Laurence Mark Rhodes, 11825 Grande Vista Dr., Whittier, Calif. 90601

[21] Appl. No.: 659,639

[22] Filed: Jun. 6, 1996

[51] Int. Cl.[6] .............................. B01D 1/14; C10B 27/00; C10B 29/00
[52] U.S. Cl. .......................... 159/16.1; 159/23; 159/26.1; 159/38; 159/44; 202/255; 202/242; 202/267.1; 202/268; 422/117
[58] Field of Search .......................... 159/16.1, 23, 26.1, 159/38, 44; 202/255, 267.1, 242, 268; 203/100; 422/117

[56] References Cited

U.S. PATENT DOCUMENTS

| | | | |
|---|---|---|---|
| 3,559,879 | 2/1971 | Bechard | 159/16.1 |
| 4,534,828 | 8/1985 | Erickson et al. | 159/16.1 |
| 5,082,525 | 1/1992 | Travis | 159/16.1 |
| 5,240,560 | 8/1993 | Gregory | 159/16.1 |
| 5,445,714 | 8/1995 | Meyers | 202/176 |
| 5,535,877 | 7/1996 | Eastcott et al. | 202/18 |

OTHER PUBLICATIONS

Nordale Incorporated, "Nordale Fluid Eliminator," Model 1000, Publication No. 1–10781, Jul. 1981, 8 pages.
Yates, "Atmospheric Evaporators," Plating and Surface Finishing, Apr. 1986, pp. 30–32, and ET–II Brochure Supplement, 3 pages.
Arkay, "PCX Evaporators and Wash Water Recirculators," Photographic Processing, Feb. 1990, 4 page brochure.
Poly Products Corporation, "Evaporative Tank™ Atmospheric Evaporator for EPA Compliance and Greater Profits," 1991, 2 page brochure.
Giant Industries, Inc., "EVS–100 Waste Water Evaporator System," Brochure, 1991, 2 pages.
Roilgard, Inc., "VE–200 Gas Fired Evaporator," Brochure RG–Apr. 1994 ABC–VE200/2500, Apr. 1992, 1 page brochure.

Solvents On–Site Recycling, Inc., "Solvent Recycling Made Simple," Texas Environmental News, Reprint vol. 3, No. 5, May 1993, 4 pages.
"Solving disposal problems With water–based waste," Metflax, Sep. 1993.
Samsco, Inc., "Water Evaporator," 1994, 4 page brochure.
Landa, Inc., "Water Blaze Evaporators," Form #96–0346, Jan 1994, 6 page brochure.
Poly Products Corporation, "ET–Companion Condenser," Jan. 1994, 3 page brochure.
Fen–Tech Environmental, Inc., "EVAP–O DRY," Nov. 1994, 6 pages.
Erickson, "Description of Electrical Controls on the Nordale Fluid Eliminator," Nordale Incorporated Paper No. 910929, 3 pages.

(List continued on next page.)

*Primary Examiner*—Nina Bhat
*Attorney, Agent, or Firm*—Christie, Parker & Hale, LLP

[57] ABSTRACT

An evaporator includes a tank covered by a lightweight lid which is easily lifted to avoid high pressure in the event of an explosion. The bottom of the tank includes a flat portion which slopes downwardly toward an outlet in the sidewall of the tank. The flat section is substantially wider than the outlet to accommodate use of a square-nosed shovel to clean the tank. A fire tube in the bottom of the tank receives hot gases from a burner. A thermometer senses the temperature of the wall of the fire tube to respond to low liquid level in the tank, scale on the fire tube wall, and buildup of solids in the mixture. The open lower end of an upwardly extending standpipe is in liquid in the tank. The upper end of the standpipe is closed by a ball valve and extends above the mixture in the tank. Devices are provided for making the pressure in the standpipe different from atmospheric pressure. Devices are also provided for sensing pressure in the standpipe to turn off the evaporator when the level of the mixture in the tank drops below the lower end of the standpipe.

26 Claims, 3 Drawing Sheets

OTHER PUBLICATIONS

Erickson, et al., "Description of Air Pressure/Fluid Level Monitoring System," Nordale Incorporated Paper No. 911217, 6 pages.

Hydro–Blast, Inc., "Wastewater Evaporation Systems" (Hydro–Vap™), 4 page brochure.

Monitrol, Inc., "The MWE Self–Clean Water Evaporator," 1 page brochure.

Monitrol, Inc., "The LTE Low–Temp Evaporator," 1 page brochure.

Redi Strip Company, "REDiVAP® from Redi Strip," Data Sheet V316–03–90, 1 page brochure.

American Metal Wash, Inc., "Evaporator Model 100 EV," 1 page brochure.

Reduction Technologies, Inc., "Don't let water turn to waste," (RE Series, Evaporators, RG Series and Recyclers), 6 page brochure.

Environmental Management Technologies, Inc., "Stop Burning Up Profit On Hazardous Waste Disposal," (EMTEC Recyclers, Evaporators, Waste Liquid Reducers), 6 page brochure.

Landa, Inc., "New Wastewater Technology," Environmental Solutions, No. 102, 4 page brochure.

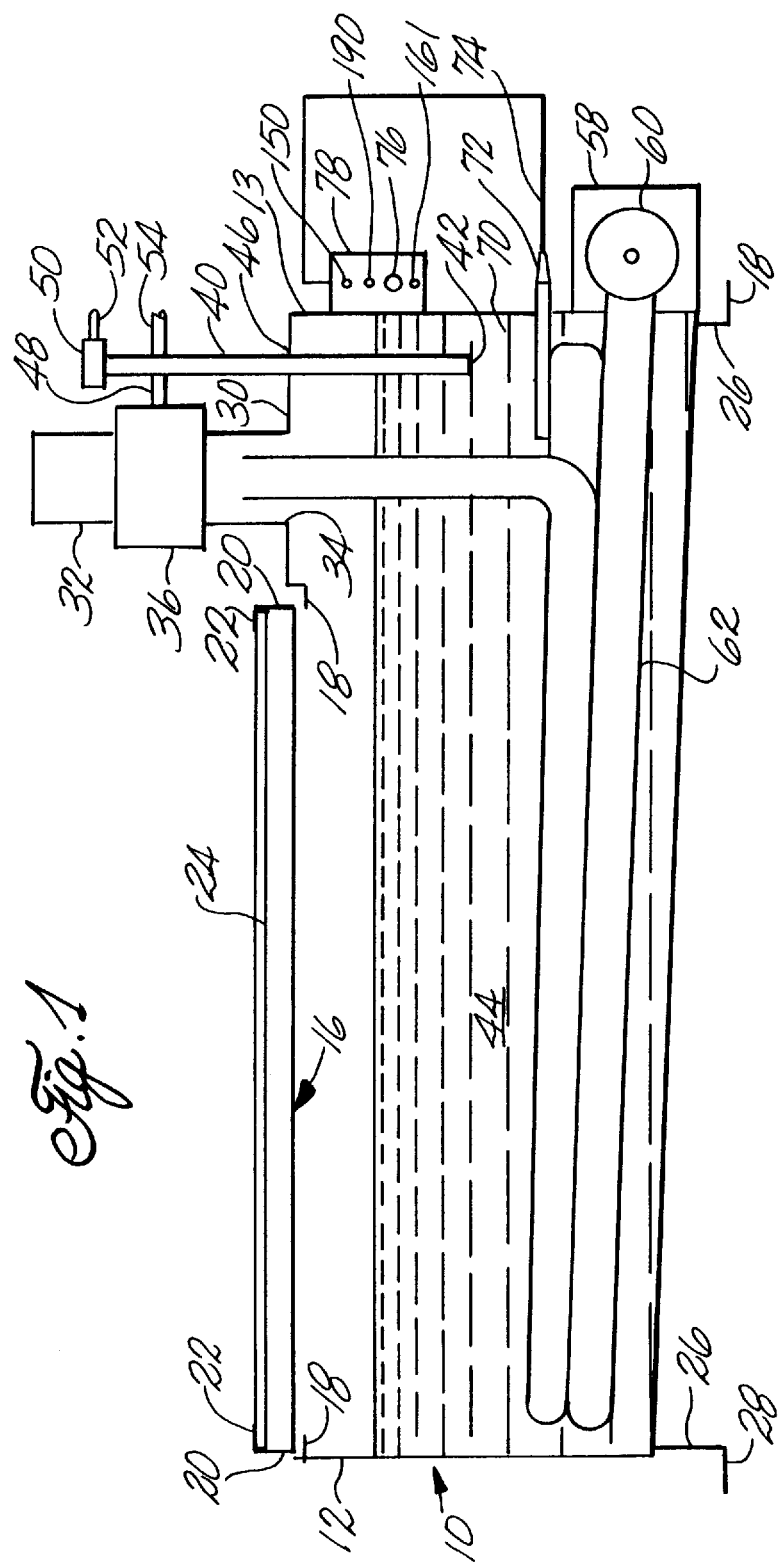

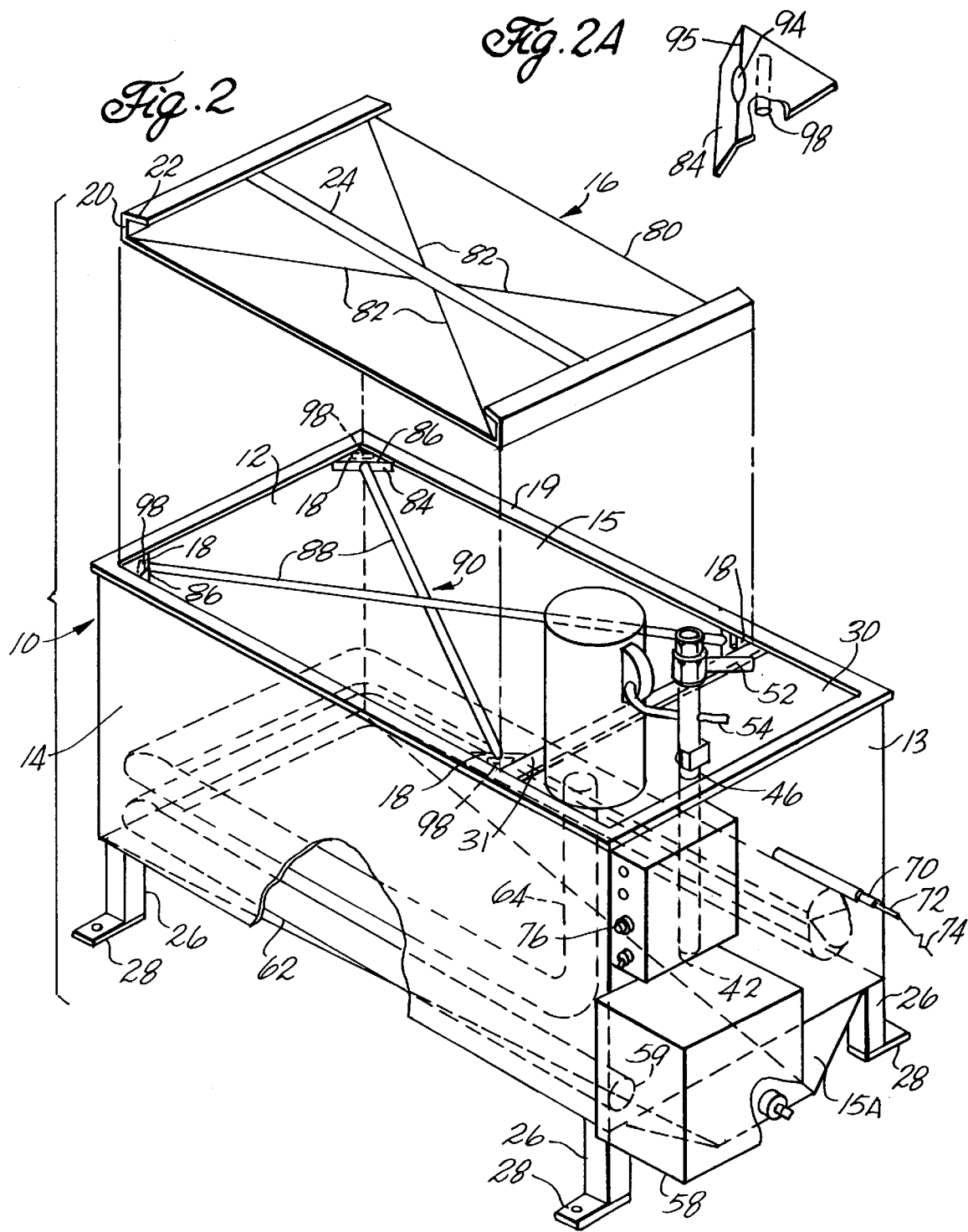

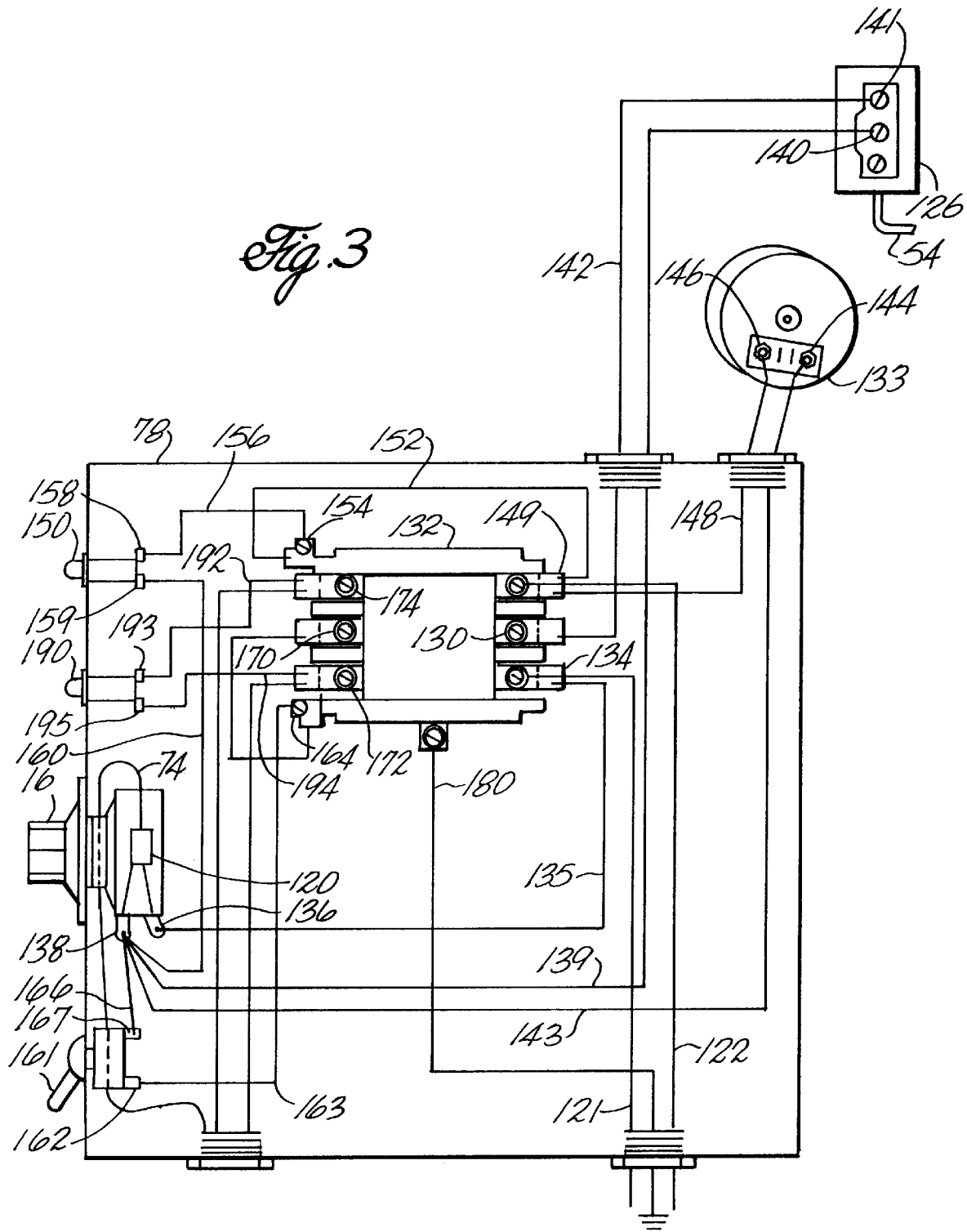

EVAPORATOR

This invention relates to evaporators.

The invention is useful in evaporating different kinds of volatile liquids from various mixtures. It is especially useful in removing water from a mixture which contains less volatile hazardous waste materials, such as oil, dissolved chemicals, solid particles, ink, water-based paints, and the like, which are produced by industrial operations.

Environmental considerations require strict attention to disposal of industrial waste, especially waste water which in years past has been dumped into sewer lines. To minimize the deleterious effect on the environment of indiscriminate waste disposal, manufacturers and machine shop operators now collect waste water, and have it removed from the premises in sealed drums or the like. Much waste water contains a relatively low percentage of objectionable material. Nevertheless, even small quantities of hazardous materials require the water to be disposed of properly. The cost of hauling waste water and disposing of it is a major consideration in the operation of many businesses. Accordingly, evaporators have been developed to evaporate water from waste materials before shipping the concentrated mixture to a proper disposal site. For example, waste water volume can be reduced to as little as 1/30 of its original volume, thereby effecting substantial savings in hauling costs.

Prior art evaporators, although effective in reducing the volume of waste water, are expensive, difficult to operate and maintain, and sometimes present explosion hazards. For example, some prior art evaporators are covered with heavy lids or lids which are secured to the evaporator. If an explosion occurs, the prior art lids confine the explosion pressure until it causes a catastrophic rupture of the equipment. In one form, this invention provides a lightweight lid which merely rests on the evaporator and, therefore, is free to lift clear of the evaporator before an explosion can develop a destructive pressure.

Some prior art evaporators are difficult to service and maintain because of a cluttered arrangement of fire tubes and the shape of the evaporator bottom, which prevents easy access for cleaning sludge and the like from the equipment. In a preferred embodiment, this invention provides an unobstructed, flat sludge collection zone in the bottom of the evaporator so sludge can easily be removed or shoveled toward an outlet in the evaporator.

Prior art evaporators do not have reliable, inexpensive systems for automatically turning them off after the mixture drops below a safe level, and which can easily be testing and serviced. One form of this invention provides such a system, which permits evaporators to be safely left operating and unattended for long periods of time.

In some prior art fire tube evaporators, an attempt is made to control them by measuring the temperature of the liquid mixture within the evaporator. As the mixture becomes increasingly concentrated, the boiling point of the liquid goes up, and temperature is sensed to control the operation. However, that arrangement does not detect a low liquid level in the evaporator or the buildup of scale on the fire tube within the evaporator. Either of those conditions can lead to dangerous overheating of the fire tube. In one embodiment, this invention avoids that disadvantage by providing a temperature sensor secured to the fire tube wall to detect the temperature of the fire tube wall, which responds to the temperature of the mixture in the evaporator, buildup of scale on the fire tube wall, solids buildup in the evaporator, and low mixture level in the evaporator. If any of those variables approaches a dangerous limit, the evaporator burner automatically turns off.

In brief, this invention provides a safe, efficient, and inexpensive evaporator which is easy to operate and maintain, and which also minimizes danger from fire or explosion.

In one form of the invention, the evaporator includes a tank having sides and a bottom for holding a mixture of liquid to be evaporated and less volatile material. The tank is open at its top, and a lightweight lid rests on inwardly extending supports, such as gussets, secured to the tank just below a rim which surrounds the tank. The lid substantially covers the tank, and the edges of the lid rest on the supports to lie in a substantially horizontal plane just below the tank rim. Upwardly extending and horizontally spaced webs on the lid are connected to opposite ends of an elongated handle spaced above the lid. Means are provided for heating the material in the tank to evaporate the volatile liquid. If an explosive mixture forms within the tank, and is ignited, the lightweight lid is easily lifted, and thus prevents the buildup of any dangerous pressure within the tank.

Preferably, the lid is shaped so that it slopes upwardly and inwardly from its edges to provide a centrally raised area to cause any liquid which collects on the top of the lid to drain to the edge of the lid and drop into the tank. The lid, which is preferably made of sheet metal, is bent at opposite edges to form the webs for the handle as referred to above.

To prevent the lid from being accidentally dropped into the tank, and possibly splashing hot waste material on the operator, an open framework is mounted across the open top of the tank. Preferably, the framework is an X-shaped frame made of two crossed metal rods welded together where they cross at their respective center points. The rods are slightly flexible to permit them to be easily installed and removed when access to the interior of the tank is required for cleaning or other maintenance operation.

In another form of the invention, the evaporator tank has upright sidewalls and a bottom for holding the mixture referred to above. An outlet in the lower portion of one of the sidewalls, and between a pair of other sidewalls, permits concentrated mixture to be withdrawn from the tank, as required. The bottom of the tank slopes downwardly toward the outlet, and each of the pair of sidewalls include respective portions which slope downwardly and inwardly toward each other, and which are inclined toward each other in the direction of the outlet to contact the sidewall with the outlet so the minimum distance between the pair of sidewalls where they contact the tank bottom is substantially greater than the maximum dimension of the outlet. This provides a relatively wide flat section, or sludge collection zone, adjacent the outlet to facilitate the use of a square-nosed shovel in scraping sludge and other material from the tank bottom when cleaning is required.

In another embodiment of the invention, the evaporator includes a tank having sidewalls and a bottom for holding the mixture referred to above. Means are provided for heating the mixture in the tank to evaporate the volatile liquid. An upwardly extending standpipe is mounted in the tank with a lower end of the standpipe in the mixture. The lower end of the standpipe is open, and the upper end of the standpipe is closed by a quick-opening closure, such as a ball valve, gate valve, or a cap with bayonet threads. Means are provided for creating a pressure inside the standpipe different from that outside the standpipe so the pressure in the standpipe will change if the level of the liquid mixture in the tank drops below the lower end of the standpipe. Means are provided for sensing pressure in the standpipe to turn off the means for heating the mixture in the tank. In the preferred form of this embodiment of the invention, the standpipe is vertically adjustable. A stack is connected to the tank above the mixture for removing evaporated liquid from the tank. A blower in the stack moves evaporated liquid away from the tank, and a hose is connected to the blower to generate the pressure differential within the standpipe. Preferably, the hose is connected to the blower to create a reduced pressure in the standpipe.

In another embodiment of this invention, the evaporator includes a tank having sidewalls and a bottom for holding the mixture referred to above. An elongated fire tube in the lower part of the tank transfers heat to the mixture. A temperature sensor is secured to the fire tube, and a burner supplies hot gas to the fire tube to heat the mixture and evaporate the volatile liquid. The burner is electrically controlled, and an electric switch is provided for turning off the burner. Means connect the temperature sensor to the switch to turn off the burner in response to the temperature of the fire tube wall. Preferably, the temperature sensor includes an elongated housing or thermometer well welded to the fire tube. A removable bulb and capillary tube are disposed in the well. The bulb and capillary tube are filled with an expandable liquid, say, oil, and the pressure in the oil operates the switch for turning the burner off.

These and other aspects of the invention will be more fully understood from the following detailed description and the accompanying drawings in which:

BRIEF DESCRIPTION OF THE DRAWINGS

FIG. 1 is a diagram of an evaporator showing some of the embodiments of this invention;

FIG. 2 is a perspective view of a preferred embodiment of the invention;

FIG. 2A is a perspective of one of the gussets which supports a corner of the lid; and FIG. 3 is a schematic diagram of the electrical circuitry for controlling the evaporator.

Referring to FIG. 1, a rectangular tank 10 includes left and right sidewalls (as viewed in FIG. 1) 12 and 13, respectively, front and back sidewalls 14 and 15, respectively (shown only in FIG. 2), a bottom 15A and a rectangular lid 16 which rests on gussets 18 welded to the underside of an inwardly extending rim 19 welded to the upper edges of the tank. The left and right (as viewed in FIG. 1) ends of the rectangular lid 16 are bent to form upwardly extending transverse webs 20, and each web is bent to extend inwardly to provide a horizontal flange 22. A longitudinally extending handle 24 is welded at each end to the interior face of a respective web 20 and to the underside of a respective flange 22. The integral construction of the lid, webs, flanges, and tubular handle permit the lid to be made of relatively thin sheet metal, say, 18 gauge stainless steel, and still have the rigidity and ruggedness required for industrial use. The handle acts as a torque tube, which resists deformation of the lid from its normal shape. If the lid is deflected from its normal shape, the torque restores the lid to its intended shape.

Downwardly extending legs 26 and outwardly extending feet 28 support the tank in its operating position. A horizontal and rectangular deck 30 covers the right (as viewed in FIG. 1) end of the tank over an area equal to about 25% of the total cross-sectional area of the tank. The deck is welded around its edges to the underside of the tank rim, and a transverse bar 31 is welded to the rim at the left (as viewed in FIG. 2) edge of the deck. An upright stack 32 is welded at its lower end around a cylindrical opening 34 in the deck for removing evaporated liquid from the tank. The gussets 18 at the right (as viewed in FIG. 2) end of the lid are welded under the corners formed by the tank rim and the transverse bar. A blower 36 in the stack facilitates moving vapor away from the tank. An upwardly extending standpipe 40 has its lower end 42 submerged in a body of liquid mixture 44 in the tank. The standpipe extends up through an opening 46 in the deck and is connected by a flexible hose 48 to the blower so that when the blower operates, the pressure within the standpipe is reduced below atmospheric. The upper end of the standpipe is closed by a ball valve 50, which can be opened and closed with a handle 52. A flexible control hose 54 connects the interior of the standpipe to a vacuum switch 126 (shown in FIG. 3), which operates to turn off an electrically controlled gas-fired burner 58 mounted on the right sidewall outside the tank. The burner may be of conventional type, such as a Wayne (Scott Fetzer) HSG 400, which includes a squirrel-cage blower 60 that forces hot combustion products from the burner 58 through an inlet 59 of a serpentine fire tube 62 (described in more detail below with respect to FIG. 2) in the bottom of the tank. A discharge end 64 of the fire tube extends up from the tank and into the stack 32.

A thermometer well 70 is welded for a substantial distance to the exterior of fire tube 62. The thermometer well is sealed through the right (as viewed in FIG. 1) sidewall 13. A thermometer 72 is inserted into the well from the exterior of the tank. The thermometer may be of conventional type, say, oil-filled. An oil-filled capillary tube 74 transmits oil pressure in the thermometer to a thermostat 76 mounted in a control panel 78 on the right sidewall outside the tank (described in more detail below with respect to FIGS. 2 and 3).

As shown best in FIG. 2, the lid 16 loosely covers the open portion of the top of the tank by resting on the four gussets 18. The lid includes a central sheet 80 which is deformed slightly upwardly from its four edges along diagonal lines 82 so the central portion of the sheet 80 is slightly raised with respect to the edges of the sheet. This causes any liquid which may collect on the lid to drain to the edges of the sheet 80 and drop through space between the tank rim and lid edge back into the tank because the edges of the lid are below the top surface of the tank rim 19.

The length of the lid from left to right (as viewed in FIG. 2) is about 10% shorter than the distance from the left end of the tank to the transverse bar 31 to leave a gap (not shown) between the lid and the tank to ensure adequate draft for the blower. The shape of the lid also causes the intermediate parts of the edges of the sheet to flare slightly downwardly, permitting outside air to flow into the tank under the corners of the lid, across the underside of the lid, and then to the stack to be exhausted with evaporated liquid. This helps to keep the handle 24 cool enough for safe handling by an operator, even without gloves. The handle preferably is carbon steel tubing, is located along the central longitudinal axis of the lid, and is positioned to leave about 1½" clearance between the underside of the handle and the top of the lid to make it easy for an operator to grasp the handle without contacting the lid.

As shown best in FIG. 2, each gusset on the tank includes a respective vertical plate 84 formed integrally with the innermost edge of the gusset. A circular bore 86 in the center of each plate 84 at the left (as viewed in FIG. 2) end of the tank receives a respective end of left legs 88 of an X-shaped frame 90, which also includes a pair of right legs 92, the outer end of each of which fits into a respective opening 94 formed on the fold line 95 (see FIG. 2A) between gusset 18 and a vertical plate 84. The diameter of each opening 94 is about twice that of the bore 86 in the vertical plates on the gussets at the left end of the tank. The X-frame is preferably formed from two straight steel rods welded together at their center portions where they cross. The diameter of the rods is just slightly less than that of bore 86. The rods are slightly deformed in the welded area to lie substantially in the plane defined by the horizontal surfaces of the gussets.

The X-frame is installed in the operating position shown in FIG. 2 by inserting the two left ends of the X-frame into respective bores 86, and forcing the left legs 88 to bear against a respective transverse stop 98 welded to the underside of each gusset. Inserting the X-frame to force the left legs 88 against the stops springs the legs outwardly. The frame is then lowered so that the right ends of the right legs 92 each drop into a respective opening 94. The frame is then released so the slightly deformed left legs 88 spring back to their normal position, forcing the frame to the right until the right ends of right legs 92 each engage a respective stop 98. The frame is thus snugly locked into place. To remove the frame, an operator pulls the frame to the left to cause the left legs to slide to the left until they engage their respective stops. This moves the right ends of the right legs to a position where they can be lifted from their respective openings 94 in the gussets, which still support the right ends of the right legs to prevent the frame from accidentally dropping into the tank. The right end of the frame is then lifted until the ends of left legs clear their respective gussets. Thereafter, the frame is slipped to the right to remove the left ends of the frame from their respective gussets.

With the frame in its proper operating position shown in FIG. 2, the lid 16 cannot be dropped accidentally into the tank by an operator, who may lift it from time to time to inspect evaporator operation, or to add mixture from which water is to be evaporated.

The metal parts of the evaporator described above can be made of any suitable material, preferably steel, such as 304 or 316 stainless steel.

To facilitate cleaning out the evaporator, the tank bottom 15A slopes downwardly from left to right (as viewed in FIGS. 1 and 2). The lower portions of the front and back sidewalls slope downwardly and toward each other, and converge in a direction toward an outlet 100 located in the bottom edge of the right side wall 13. The front and back sidewalls contact the right sidewall so the minimum distance between the front and back sidewalls where they contact the bottom is substantially greater than the maximum horizontal dimension of the outlet. For example, if the outlet diameter is 2", the distance between the lower corners of the right ends of the front and back sidewalls is between 6 and 8". Thus, a relatively flat and wide horizontal section of the tank bottom provides a sludge collection zone adjacent the outlet to facilitate the use of a square-nose shovel in lifting unevaporated material out of the tank or moving it toward the outlet. Moreover, the squared-off right (as viewed in FIG. 2) end of the collection zone permits the outlet to be located anywhere along the bottom edge of the right sidewall. This facilitates mounting of equipment, such as the burner, on the lower part of the outside of the right sidewall.

As shown best in FIG. 2, the inlet end 59 of the fire tube 62 is in the forward right, lower corner of the tank. The fire tube extends longitudinally from the burner along the bottom of the tank adjacent the front wall to the left sidewall, crosses from front to back along the left sidewall, extends from right to left along the back wall of the tank, turns up to make a short 180° turn and extends from right to left adjacent the rear wall to the left sidewall, turns forward to extend from the rear to the front of the tank, then turns to extend from left to right adjacent the forward wall, and then turns toward the center of the tank and up into the stack, where the outlet end 64 of the fire tube is disposed. This leaves the central portion of the tank open for easy access for cleaning, repair, or other maintenance operation.

The blower 36 can be of any suitable conventional type, such as a paddle wheel-type mounted on the exterior of the stack to rotate about a horizontal axis 108 so paddles (not shown) enter the stack at a lower location and leave the stack at an upper location. Blowers supplied by Tjerlund Products, Inc. of White Bear Lake, Minn. provide satisfactory performance.

The standpipe makes a sliding fit through opening 46 and is secured in any desired vertical position by an adjustable clamp 110 secured to the exterior of the standpipe and which rests on top of the deck 30.

The evaporator is operated by filling it with a liquid mixture to an appropriate level, say, about ¾ full. The vertical standpipe is adjusted and clamped into an appropriate position to set the minimum level at which the evaporator is to operate. For example, the lower end of the standpipe is usually set about one foot above the uppermost surface of the fire tube to ensure that the fire tube is always covered by mixture during the operation of the evaporator.

The thermostat (which may be of conventional type, such as Item S-316-48 supplied by Robert Shaw-Uniline Division of Corona, Calif.) is turned to the required setting for operating temperature, say, 100° C. This closes a bellows switch 120 in the thermostat (see FIG. 3), which applies a.c. power from first and second a.c. power lines 121, 122, respectively, to an electric motor 123, which powers the stack blower 36 shown in FIGS. 1 and 2. Operation of the blower drives pulls air from the tank interior and drives it out the stack 32. This also creates a low pressure in hose 48 connected to the upper portion of standpipe 40. The reduced pressure in standpipe 40 is transmitted through control hose 54, which is connected to a vacuum switch 126, as shown in FIG. 3. The reduced pressure in hose 54 closes the vacuum switch 126, causing the electrical power to be available at a first central contact 130 of a 6-contact contactor 132, which may be of conventional type, such as a Definite Purpose contactor sold by Furnas Electric as Model 42CF35AF. With vacuum switch 126 closed, power is available at first central contact 130 because first power line 121 is connected to a first power contact 134 on the contactor 132. An electrical conductor 135 connects first power contact 134 to a first terminal 136 connected to one side of switch 120 in the thermostat. Closed switch 120 connects first terminal 136 of the thermostat with a second terminal 138 of the thermostat. Second terminal 138 is connected by an electrical conductor 139 to a first terminal 140 of the vacuum switch 126, which has a second terminal 141 connected by an electric conductor 142 to first central contact 130. Electrical lead 143 connects second terminal 138 of the thermostat bellows switch 120 to a first terminal 144 on the blower motor 123. A second terminal 146 of the blower motor is connected by electrical lead 148 to a second power contact 149 on the contactor. Thus, when thermostat bellows switch 120 is closed by turning the thermostat to the desired temperature setting, power is supplied from first power line 121 to contact 134, through conductor 135 to the first thermostat switch terminal 136, and to thermostat switch second terminal 138 and to electrical lead 143 to the first terminal 144 of the blower motor. The second terminal 146 of the blower motor is connected through electrical lead 148 to the second contact 149 on the contactor, and thus to the second power line 122.

A blower light 150 turns on when the blower is operating because of power supplied from the second power line 122 through second contact 149, an electrical conductor 152, a first initiating contact 154, and an electrical conductor 156 connected to a first terminal 158 of the blower light. A second terminal 159 of the blower light is connected to first power line 121 by an electrical conductor 160 to the second terminal 138 on thermostat blower switch 120, and thus through the closed switch to conduct 135 and first power contact 134 back to the first power line 121.

Once the blower has operated long enough to establish the low pressure required in the standpipe to close the vacuum switch 126, the burner is turned on by lifting a spring-loaded momentary toggle switch 161 on the control panel to apply a pulse of electrical power from a toggle switch first terminal 162 through an electrical conductor 163 to a second initiating relay contact 164 on the contactor. An electrical conductor 166 from a second terminal 167 on the toggle switch to the terminal 138 on thermostat blower switch 120 completes the circuit so the first and second initiating contacts are momentarily supplied power to energize a relay coil (not shown), which actuates the contactor to cause contacts 130, 134, and 149 on the right (as viewed in FIG. 3) side of the contactor to be connected to contacts 170, 172, and 174, respectively. When contacts 130 and 170 are thus connected, they supply a holding current to the relay coil as long as the blower vacuum switch 126 is held in the closed position by low pressure from control hose 54 connected to the standpipe. Toggle switch 161 returns to its normally open position when it is released.

The burner turns on when the contactor closes because of electrical power supplied to the burner from contacts 172 and 174, which are connected to contacts 134 and 149 respectively. The contactor is suitably grounded through a ground lead 180. The burner ignites, the squirrel-cage blower in the burner turns on, and hot combustion gas is driven through the fire tube and out the stack. Operation of the burner is indicated by a burner light 190, which is supplied power an through electrical conductor 192 connected to a first terminal 193 on the burner light and contact 174 on the contactor. An electrical conductor 194 connects a second terminal 195 on the burner light to contact 172 on the contactor to complete the circuit.

The burner heats the mixture sufficiently to evaporate water, which is removed through the stack, aided by the operation of the blower. The temperature of the fire tube wall is sensed by the thermometer in the thermometer well, and that information is transmitted through the capillary tube 74 to the bellows switch 120 in the thermostat. If the temperature of the fire tube wall approaches an unsafe limit due to the liquid level falling too low, buildup of scale on the fire tube, or buildup of oil or solids (dissolved or particulate) in the mixture, the bellows switch 120 in the thermostat opens, interrupting the supply of electrical power to the blower motor. This permits the pressure in the standpipe to return to near atmospheric, causing the vacuum switch 126 to open. This interrupts the supply of current to the holding relay through contacts 130 and 170, permitting the contactor to spring to the open position so that the contacts on the right side of the contactor are no longer connected to the corresponding contacts on the left side. This shuts down the operation of the burner. As soon as the temperature of the fire tube wall returns to a safe value, thermostat bellows switch 120 closes, and the blower motor turns back on to remove vapor from the tank. However, the burner does not turn back on until toggle switch 16 is operated.

Thus, even though the burner may be shut down for an extended period of time (say, over a weekend), the blower turns back on and continues to remove vapor from the hot mixture. The sides and bottom of the tank are each insulated with insulation (not shown) about 1" thick to conserve heat energy.

The burner will also turn off if the level of the liquid in the tank drops below the lower end of the standpipe. In that case, the pressure in the standpipe returns to atmospheric, causing the vacuum switch 126 to open, which de-energizes the contactor 132, causing the burner to turn off. The blower continues to operate because of power supplied through conductors 121, 135, the thermostat switch 120, line 143, and line 148. Proper operation of the standpipe can easily be checked by opening the ball valve to be sure that pressure increase in the standpipe shuts down the evaporator as intended. The ball valve can also be opened to permit visual inspection (if material level in the tank is low enough), or a cleaning rod (say, a wooden dowel) to be run back and forth through the standpipe to remove any obstruction. The ball valve is preferred, but it can be replaced by any suitable quick-opening closure, such as a gate valve or a cap secured to the upper end of the standpipe with a bayonet threaded connection.

The adjustable standpipe makes it easy to set the evaporator for unsupervised operation over an extended period of time. For example, the evaporator can be filled just before closing time on a Friday. With the lower end of the standpipe set to turn off the burner when the proper level is reached, the evaporator can safely be left running unsupervised, and the evaporator will automatically shut down when the level of the mixture in the tank drops to the desired level. If the standpipe should inadvertently become plugged, and thus fail to shut down the burner when the proper level is reached, the thermometer in the well provides a backup safety feature because when the level of the mixture in the tank falls below the fire tube, the thermometer will turn off the burner. The thermometer will also shut down the burner if the boiling point of the mixture becomes so high as to approach unsafe limits.

The circuit shown in FIG. 3 can be wired so that if the fire tube wall temperature increases toward an unsafe value (say, due to the boiling point of the mixture in the tank rising because of increased concentration of oil), the blower will continue to run, and the burner will turn off and remain off until restarted manually. With this arrangement, the blower makes efficient use of the heat stored in the mixture.

Once the mixture in the evaporator is sufficiently concentrated, the evaporator is turned off and the concentrated mixture permitted to cool to a temperature which permits safe handling. The drain plug for the evaporator is opened, and concentrated material is collected for proper disposal. From time to time, it may be necessary to scrape or shovel out the bottom of the tank to remove accumulated sludge which will not flow through the outlet. Such removal is effected by removing the lid and the X-frame, and using a square-nose shovel to scrape material toward the outlet, or to shovel material from the tank.

I claim:

1. Apparatus for evaporating a volatile liquid, the apparatus comprising:

a tank having sides and a bottom for holding the liquid, the tank having an open top;

a lid disposed on the tank to substantially cover the open top of the tank;

upwardly extending and horizontally spaced webs on the lid;

an elongated handle spaced above the lid and secured at each end to a respective web; and means for heating the material in the tank to evaporate the volatile liquid.

2. Apparatus according to claim 1 in which the lid slopes upwardly and inwardly toward a central portion, and is spaced inwardly from the sides of the tank.

3. Apparatus according to claim 1 in which the handle extends over the center of gravity of the lid.

4. Apparatus according to claim 1 in which the handle is tubular and is spaced above the top surface of the lid by at least 1".

5. Apparatus according to claim 1 in which the lid is made of sheet metal with upturned edges to form the webs.

6. Apparatus according to claim 5 in which the upper portion of each web is folded to form a substantially horizontal flange integral with the web.

7. Apparatus according to claim 1 which includes inwardly extending supports on the upper portion of the tank to provide resting points for the lid.

8. Apparatus according to claim 1 which includes an open frame removably mounted across the top of the tank and under the lid.

9. Apparatus according to claim 8 in which the frame is X-shaped.

10. Apparatus according to claim 9 in which the X-shaped frame is made of two crossing steel rods welded together at respective intermediate portions.

11. Apparatus according to claim 10 in which two ends of the X-shaped frame fit into horizontal recesses at one end of the tank, and the other ends of the X-shaped frame fit into horizontal recesses at the other end of the tank.

12. Apparatus according to claim 11 in which the X-shaped frame is flexible to facilitate inserting it in and removing it from the recesses.

13. Apparatus according to claim 7 in which the supports are gussets mounted on the tank.

14. Apparatus according to claim 13 in which each gusset includes a substantially vertical plate, each plate having a substantially horizontal bore extending through it, and an X-shaped frame with four respective ends, each end being secured in a respective bore.

15. Apparatus according to claim 14 which includes a stop welded to the undersurface of each gusset to limit longitudinal travel of a respective leg of the X-shaped frame.

16. Apparatus according to claim 14 in which the substantially vertical plates in a pair of the gussets are formed integrally with respective gusset by bending the gusset along a fold line, and each horizontal bore of such gussets is located in the fold line.

17. Apparatus for evaporating a volatile liquid, the apparatus comprising:
    a tank having upright sidewalls and a bottom for holding the mixture;
    an outlet in the lower portion of one of the sidewalls and between a pair of other sidewalls;
    the bottom including a substantially flat portion which slopes downwardly toward the outlet;
    each of the pair of sidewalls including respective portions which slope downwardly inwardly toward each other and are inclined toward each other in the direction of the outlet to contact the sidewall with the outlet so the minimum distance between the pair of sidewalls where they contact the bottom is substantially greater than the maximum horizontal dimension of the outlet to provide a sludge collection zone with a substantially flat bottom.

18. Apparatus according to claim 17 in which the minimum distance is at least about three times greater than the maximum horizontal dimension of the outlet.

19. Apparatus for evaporating a volatile liquid, the apparatus comprising:
    a tank having sidewalls and a bottom for holding the liquid;
    an elongated fire tube in a lower part of the tank for transferring heat to the liquid;
    a temperature sensor secured to the fire tube insert at a location within the tank;
    a burner for supplying hot gas to the fire tube to heat and evaporate the liquid;
    a switch for turning off the burner; and
    means connecting the temperature sensor to the switch to turn off the burner in response to the temperature of the fire tube.

20. Apparatus according to claim 19 in which an elongated thermometer well is welded to the exterior of the fire tube in the tank, and a thermometer is disposed within the well and connected to the switch for turning off the burner.

21. Apparatus for evaporating a volatile liquid, the apparatus comprising:
    a tank having sidewalls and a bottom for holding the liquid;
    means for heating the mixture to evaporate the volatile liquid;
    an upwardly extending standpipe mounted in the tank with a lower end of the standpipe being in the liquid, the lower end of the standpipe being open;
    a ball valve mounted in the upper end of the standpipe;
    means for creating a pressure differential between the interior and the exterior of the standpipe; and
    means responsive to pressure in the standpipe for controlling the heating means.

22. Apparatus according to claim 21, which includes means for raising and lowering the lower end of the standpipe.

23. Apparatus for evaporating a liquid, the apparatus comprising:
    a tank having four upright sidewalls and a bottom for holding the liquid;
    an elongated fire tube in a substantially U-shaped configuration disposed in a lower part of the tank for transferring heat to the mixture, the fire tube being disposed adjacent three of the sidewalls so the U-shape opens toward the fourth wall to leave a substantially unobstructed space extending over most of the tank bottom from the base of the U-shape to the fourth wall; and
    a burner for supplying hot gas to the fire tube to heat the mixture and evaporate the volatile liquid.

24. Apparatus according to claim 23 which includes an outlet in the lower portion of the fourth sidewall.

25. Apparatus according to claims 23 or 24 in which the bottom is substantially flat, and a pair of upright sidewalls each extend upwardly and outwardly from opposite sides of the bottom to form a sludge collection zone with a substantially flat bottom.

26. Apparatus according to claim 25 in which the outlet is closer to one of the pair of sidewalls than the other.

* * * * *